United States Patent [19]
Lazaridis et al.

[11] Patent Number: 5,555,241
[45] Date of Patent: Sep. 10, 1996

[54] METHOD AND APPARATUS FOR MAXIMIZING THE DATA TRANSMISSION IN A WIRELESS DATA COMMUNICATION NETWORK

[75] Inventors: Mihal Lazaridis; Herb A. Little; Gary P. Mousseau, all of Waterloo; Anand Sinha, Hamilton, all of Canada

[73] Assignee: Research in Motion Limited, Ontario, Canada

[21] Appl. No.: 458,556

[22] Filed: Jun. 2, 1995

Related U.S. Application Data

[63] Continuation of Ser. No. 214,598, Mar. 18, 1994, abandoned.

[51] Int. Cl.$^6$ .................................................. H04J 3/14
[52] U.S. Cl. .......................... 370/17; 370/82; 370/94.1; 370/99
[58] Field of Search .............................. 370/77, 99, 94.1, 370/94.2, 91, 92, 93, 119, 61, 32, 118, 79, 82, 83, 13, 17, 43; 375/222, 223, 219

[56] References Cited

U.S. PATENT DOCUMENTS

| 4,665,519 | 5/1987 | Kirchner et al. | 370/94.1 |
|---|---|---|---|
| 5,056,088 | 10/1991 | Price et al. | 370/94.1 |

FOREIGN PATENT DOCUMENTS

| 0396309 | 11/1990 | European Pat. Off. . | |

OTHER PUBLICATIONS

CCITT The International Telegraph and Telephone Consultative Committee 'Recommendation X.28 —DTE/DCE Interface for a Start–Stop Mode Data Terminal Equipment Accessing the Packet Assembly/Disassembly Facility (PAD) in a Public Data Network Situated in the Same Country'Nov. 14, 1988 Melbourne, AU see paragraph 4.4.

*Primary Examiner*—Wellington Chin
*Assistant Examiner*—Huy D. Vu
*Attorney, Agent, or Firm*—Jones, Day, Reavis & Pogue

[57] ABSTRACT

The present invention provides a method for padding to maximize the number of characters transmitted by data communication equipment (DCE), such as a modem, to data terminal equipment (DTE). By employing the disclosed padding method the data throughput will be maximized and costs will be reduced by transmitting packets with a greater amount of characters. The present invention further provides a method for providing access to a control channel to invoke gateway functions to send qualified information from a DTE user to a remote system. Also a method to provide security by allowing private strings and passwords saved in a modem's stored dial strings. Additionally, a method for scrolling the DTE's screen to enhance readabilty and to provide compatability with standard terminal packages available on the market. Related apparatus is also revealed.

22 Claims, 12 Drawing Sheets

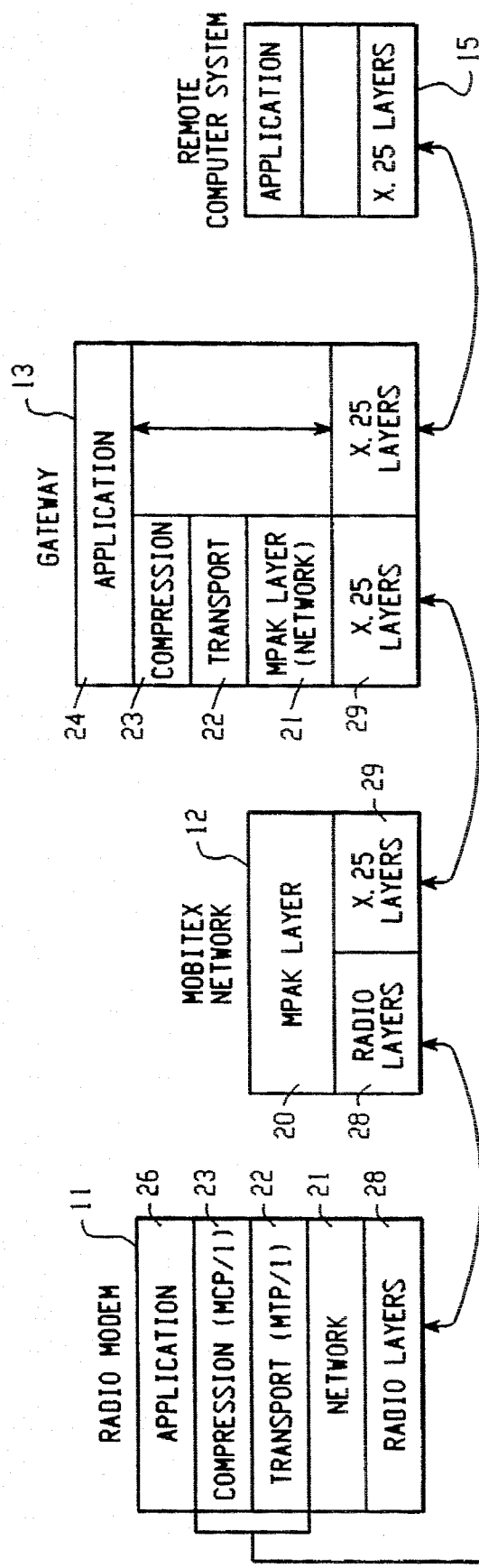
FIG. 2
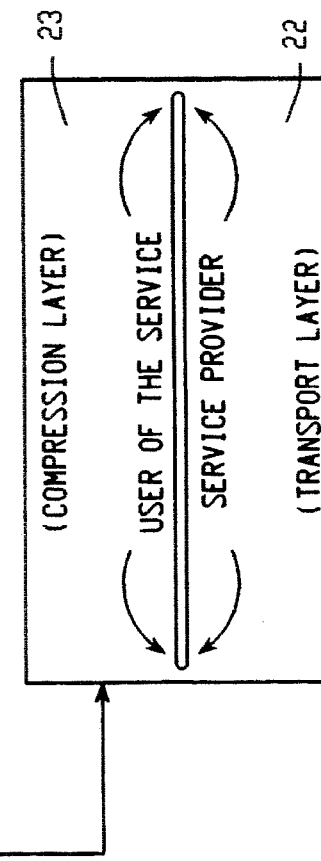

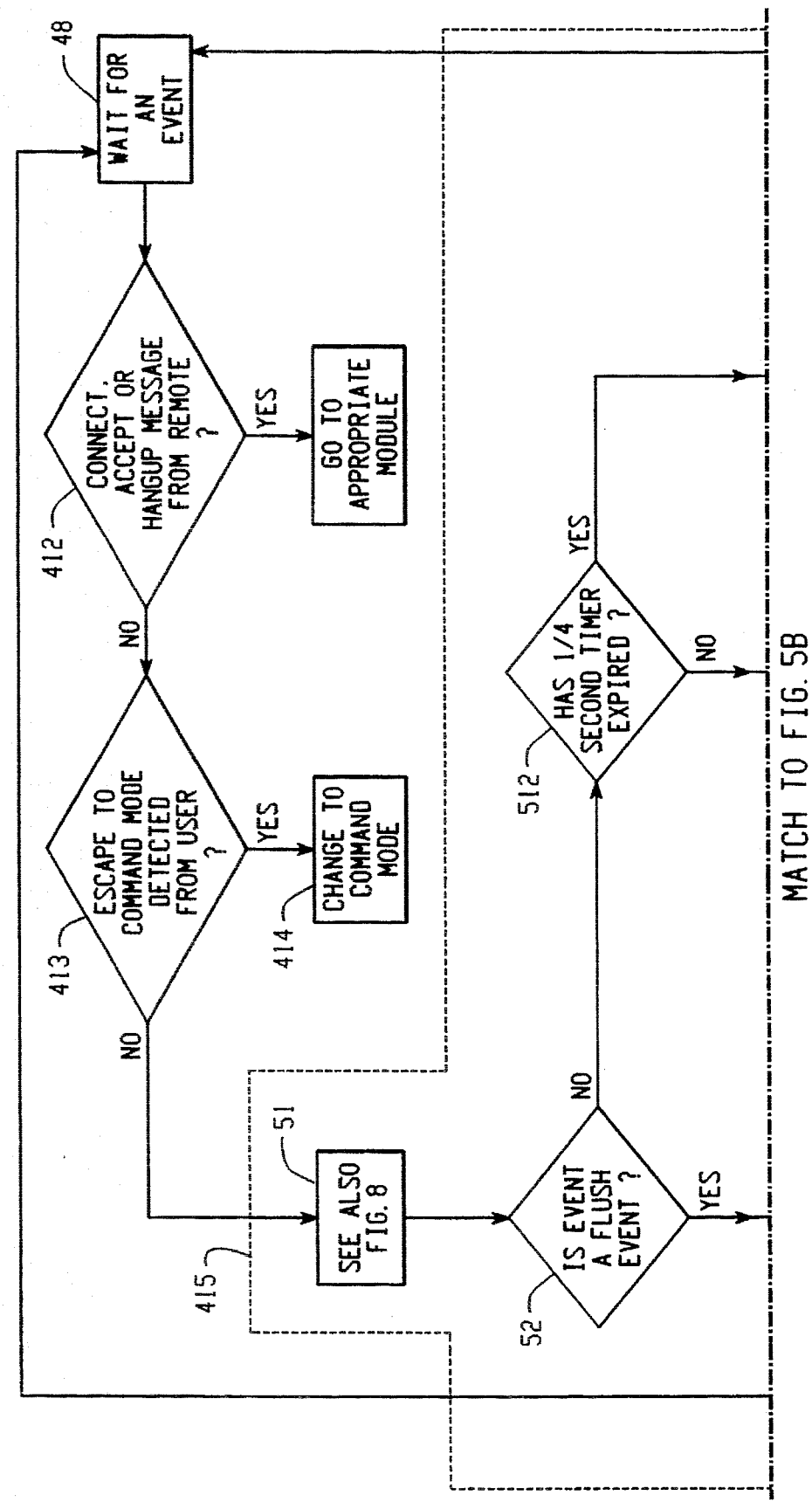

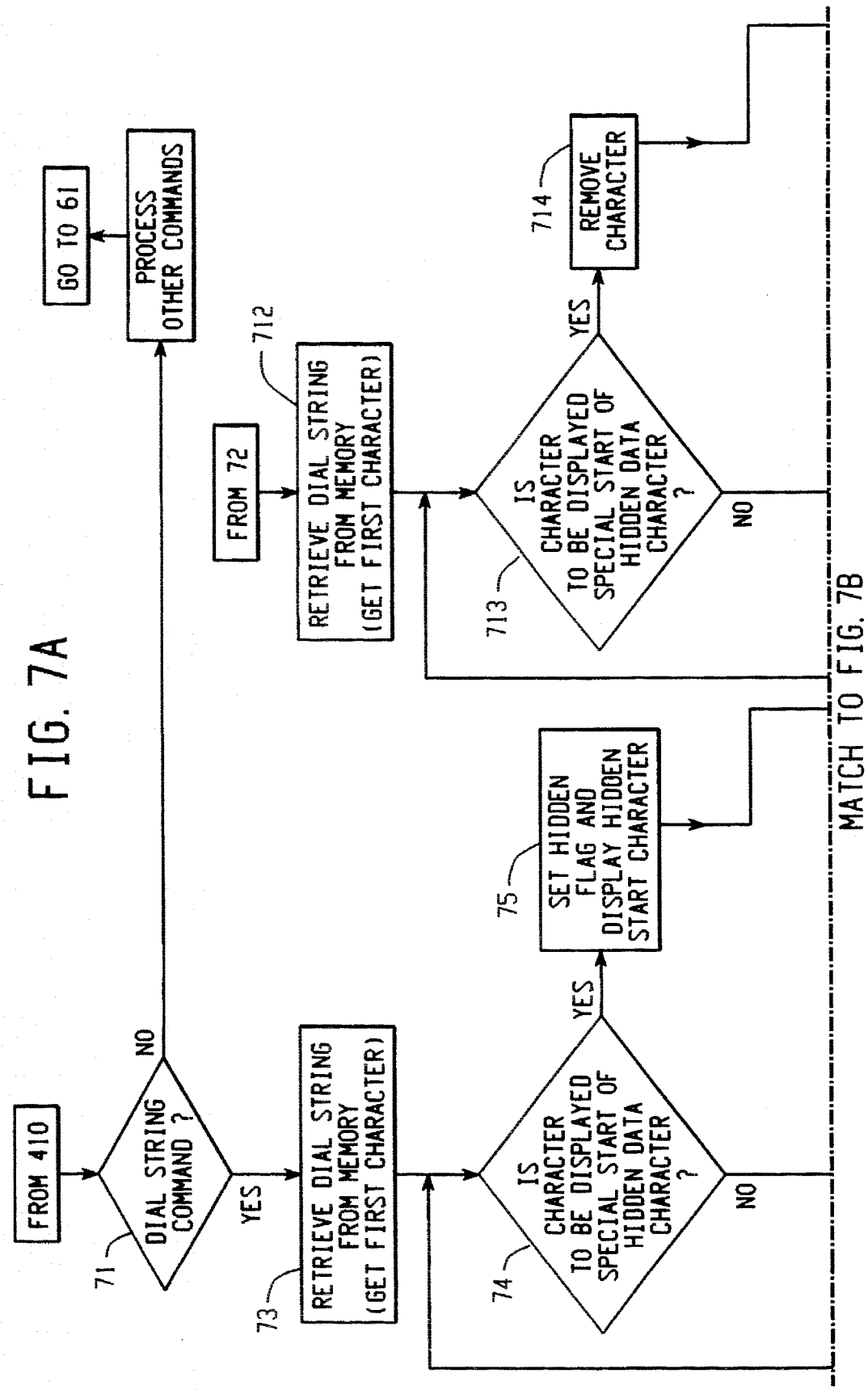

METHOD AND APPARATUS FOR MAXIMIZING THE DATA TRANSMISSION IN A WIRELESS DATA COMMUNICATION NETWORK

This is a continuation of application Ser. No. 08/214,598 filed on Mar. 18, 1994 abandoned.

BACKGROUND OF THE INVENTION

1. Field of the Invention

This invention relates generally to the art of connecting data terminal equipment (DTE) users to remote computer systems (or hosts) through a wireless or radio wave data communication network. The invention disclosed may, however, be useful for other forms of data transmission and communication systems.

2. Description of the Related Art

Over the past several decades, various communication networks have evolved to meet the growing need for access to information. Among the more familiar types of systems used for communication are wire-based telephone communication systems that use physical wires or optical fiber links to connect users. Data transmission using wire-based telephone communication systems can be accomplished using existing AT Modem technology. An AT Modem is a standard data communication equipment (DCE) connection device used with telephone equipment for converting or modulating an asynchronous stream of data into a phone line carrier signal. The connection between an AT Modem and a DTE, such as a personal computer or a portable computer, is usually through an RS-232 interface. One of the principal disadvantages of a wire-based telephone communication network is that users are limited to specific locations where wired connections are available. Another disadvantage is that wire-based telephone communication networks usually require dedicated telephone lines, which can be expensive.

Recently wireless data communication networks have emerged that enabled information exchange by sending and receiving data through high frequency radio signals. Examples of such networks include the Mobitex Radio Network (Mobitex), which is operated by RAM Mobile Data, and Ardis, which is a joint venture of Motorola and IBM. Mobitex was developed in Sweden by Ericsson/Eritel and has been installed and is maintained in many other countries. For example, in Canada, Mobitex is operated by Roger's Cantel. Making efficient use of these wireless data communication networks to connect DTE users to remote computer systems is one of the objects of the present invention. The Mobilex network will be used throughout the present application for illustrative purposes, but those skilled in the art will appreciate that other networks or applications may be used in connection with the present invention.

Electronic data communication is organized into networks that have established protocols and specifications. Communication between computers takes place over a connection that is established using a common protocol. A data communication network generally refers to a collection or grouping of computers organized for co-operative communication of data. Once a connection is established, there are a number of data transfer methods used by various data communication networks. Both Mobitex and Ardis use packet switched data transfer methods, which aggregate data into blocks called packets before it is transmitted.

Ericsson also manufactures a device called a Mobidem, which is a radio based modem that is capable of transmitting digital information across the Mobitex data communication network. The present invention adds software to a device such as a Mobidem so that it can communicate with the DTE User using an industry standard AT Command interface, called the Mobidem-AT. Communication between Mobitex and existing data communication networks or just single personal computers is now possible. Using a particular protocol, a gateway such as disclosed in the pending and commonly owned patent application Ser. No. 08/183,598 bridges the gap between the connecting parties in dissimilar networks. The objective of the gateway is to connect a Mobidem-AT to existing X.25-based network services to enhance the usefulness of Mobitex and the Mobidem-AT. The gateway product also provides enhanced speed, performance, and compatibility design when bridging different networks.

Many problems can arise when a wireless network, like Mobitex, attempts to supply connections to existing networks and computers such as an X.25 network. As the Mobidem-AT is used with a character-based DTE user the problems that must be solved include:

a) a padding method to be employed by the Mobidem-AT to ensure that every data packet has the maximum number of characters. By employing the disclosed padding method, the overall data throughput will be maximized and costs will be reduced. Most wireless networks charge their customers based on the number of characters in the packet, but charge less per character if there are more characters in the packet. Thus, having fewer characters per packet causes the price to transmit data to increase.

b) access to a control channel to invoke remote gateway functions that can be performed on behalf of the DTE user and to send. Qualified (Q-Bit) information over X.25 to a remote computer system. Use of Qualified data in X.25 is clearly documented in the X.25 specification referenced in this document.

c) increased security to allow private strings and passwords to be saved in the Mobidem-AT's stored dial strings. This allows the DTE user to use some advanced gateway functions and invoke them with fewer keystrokes thus increasing the speed of access and user friendliness.

d) a method for scrolling the DTE user's screen to increase readability and ensure compatibility with a wider set of standard terminal packages available in the market today.

Solving these and other problems in a wireless data network is the purpose of the present invention.

Thus, providing an efficient padding method, access to the control channel, increased security methods, and an advanced scrolling method in the Mobidem-AT are critical for obtaining a fast, cost effective advantage for supporting communications for mobile users.

SUMMARY OF THE INVENTION

In view of the drawbacks of the prior wireless network, it is the object of the present invention to solve the previously mentioned communication obstructions in a way that is compatible with a network such as Mobitex and works within the limitations of the AT modem interface.

To achieve the above-noted object, the preferred system configuration of the present invention includes use of data terminal equipment (DTE), such as a portable computer, together with data communication equipment (DCE), such as the Mobidem manufactured by Ericsson to communicate with a remote computer system or network. Data transmission between the DTE and the DCE consists of a serial data stream. Preferably, the connection between the DTE and the DCE is RS-232 compatible. The DCE processes the data received from the DTE user, bundles the data into packets, and transmits the data packets through a wireless communication network such as Mobitex to a gateway. The method used to bundle the characters into packets includes padding and follows a series of steps to ensure the packets are as full as possible. As characters arrive in a DCE, a check is made to see if the character fills a packet already being constructed. If the packet is full the packet is transmitted immediately. If not, each character as it is received is checked against a configured set of characters to see if a forwarding character has been received. Forwarding characters are defined by the DTE user and the settings are stored in the Mobidem-AT's memory. If a forwarding character has been received a special one-quarter second flush delay timer is set to detect whether additional characters are being received from the DTE user. This timer is set to one-quarter second but is not restricted to this value, it could be adjusted upward or downward for different environments. If no further characters are received during the one-quarter second interval, the packet is transmitted. If additional characters are received during the one-quarter second interval, they are added to the current packet and the lapsing of the flush delay timer is ignored. The flush delay timer makes the Mobidem-AT even more intelligent with respect to packet assembly. In this way if forwarding characters are imbedded in a data stream, the Mobidem-AT will not necessarily forward an undersize packet.

A packet can also be forwarded if and when a configured idle timer expires. The idle timer is an inactivity timer that can be set by the DTE user via a Mobidem-AT command when in command mode. It indicates whether there has been any activity from the DTE user for a specified length of time. A typical idle time is set to 2 to 5 seconds and expiration of the idle timer is intended to forward the last unfilled packet in any exchange with the remote computer system.

The packet is then transmitted to a gateway which transforms the data so that it is compatible with the X.25 or other standard for packet network interfaces and can be transmitted to any remote computer system or network as long as that system is compatible with the standard being used. Although the preferred system configuration incorporates a gateway that is X.25 compatible, the gateway may be configured so that it is compatible with any standardized protocol.

Furthermore, a control channel within the Mobidem-AT and gateway is introduced to address the problem of bridging networks. The present invention comprises this control channel in order to provide a method of linking Mobitex with any X.25 compatible remote computer system or network and still solve the previously discussed problems and limitations of such an operation. This control channel allows the DTE user to pass control information to the gateway or onto the X.25 control channel, called the Qualified Channel or Q-Bit channel in X.25 documentation.

On this control channel, gateway commands can be sent to perform functions on behalf of the DTE user. These control commands can also be sent during the connection phase to the gateway as well. Part of these commands can include scripting information to log the DTE user into a remote computer system on his behalf. A dial string is used by the Mobidem-AT for connection to a remote computer system. A dial string can be entered directly in a command or saved in the memory of the Mobidem-AT and invoked at a later time. The only way to access the memory is through commands entered by the DTE user. A method for hiding sensitive information is provided to prevent unauthorized use. Since the dial string only resides in the memory within the radio modem, a method of providing protection during the view and use of dial string commands is required. The memory of the radio modem cannot be accessed by any method other than those described previously. There is no other way without physically altering the radio modem to read this memory. Since the login process contains both user identification and password data these are sensitive pieces of information requiring special security precautions. Another novel operation of the Mobidem-AT is to provide a mechanism for storing these pieces of information in dial strings in the Mobidem-AT's memory. By using a pair of identifiers these strings can be loaded into the Mobidem-AT in a way that keeps them hidden and does not allow them to be read back at a later time. In this way, a DTE user would be able to keep login information private by loading it into the Mobidem-AT product.

As the DTE user connects to remote computer systems and begins interacting with them, ease of use and transparency of use become very important. To help facilitate this transparency the Mobidem-AT has a method for ensuring the DTE user's terminal scrolls correctly. This scrolling method ensures that when data is typed and sent to the remote computer system, the response from the remote system does not over-write what was typed by the DTE user. This can happen when the DTE user has the local terminal echoing all characters that are typed, including the carriage return. A carriage return echoed locally will only move the cursor to the beginning of the line just entered. Therefore, when the data arrives from the remote system it is displayed starting from the current position of the cursor. By using the Mobidem-AT's line feed insertion parameter the DTE user can always insert a line feed to the terminal and thereby move the cursor to the line below the line just entered. This line scrolling technique is also unique because it is independent of whether the Mobidem-AT is performing an echoing function or not.

The present invention and the preferred embodiment thereof, overcome the drawbacks set forth above and accomplishes the stated objects of the invention as will become apparent from the detailed description of the preferred embodiment to follow.

BRIEF DESCRIPTION OF THE DRAWINGS

The novel and useful features of the invention are set forth in the claims. The invention itself, however, as well as specific features and advantages of the invention may be best understood by reference to the detailed description that follows, when read in conjunction with the accompanying drawings.

FIG. 2 is a block diagram showing the protocol layers involved in establishing and maintaining a connection between a DTE user and a remote computer system through a wireless communication network using a gateway.

DESCRIPTION OF THE PREFERRED EMBODIMENT

Figure 1:
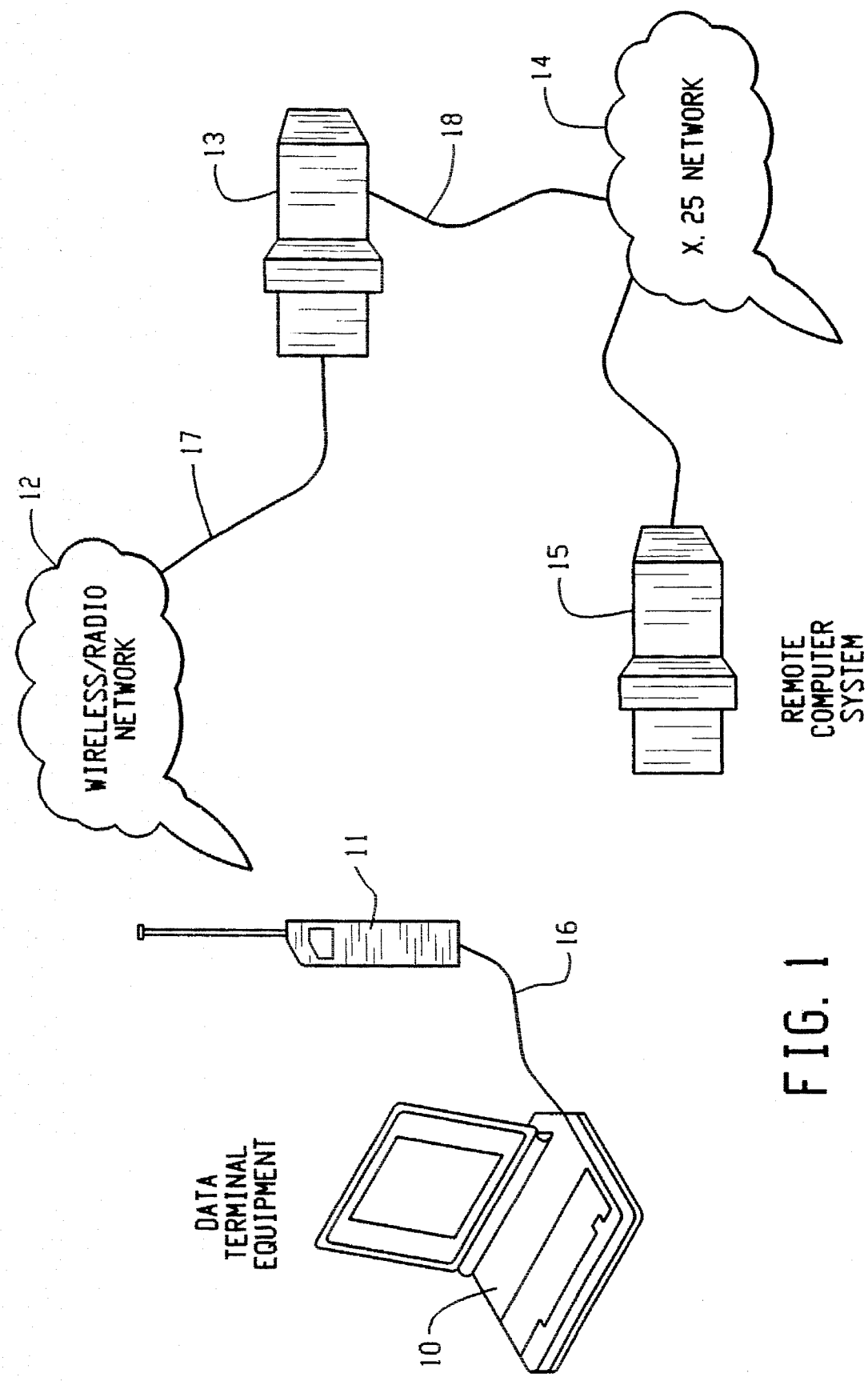
FIG. 1 is a block diagram illustrating a typical connection between a DTE user and a remote computer system through a wireless data communication network.

FIG. 1 shows the preferred system configuration for use of the present invention. A typical system consists of a DTE 10, such as portable computer, a modem 11 suitable for use with a wireless communication network such as Mobitex Radio Network 12, a gateway 13, for communication between Mobitex 12 and an X.25 network 14, and a remote computer system 15 connected to X.25 network 14. Alternatively, gateway 13 may be connected directly to remote computer system 15, since both are X.25 compatible. In the preferred embodiment modem 11 is a Mobidem-AT as developed by Research In Motion of Waterloo, Canada, but may be any radio based modem that is capable of transmitting digital information across a wireless data communication network such as Mobitex 12. DTE 10 is physically connected to modem 11 by a standard RS-232 cable 16, which is suitable for bi-directional transmission of serial data. Mobitex 12 is connected to gateway 13 by a leased line 17, and gateway 13 is connected to X.25 Network 14 by a synchronous modem or cable 18 to the remote computer system. Also, in the preferred embodiment, gateway 13 is a RIMGATE available from Research In Motion of Waterloo, Canada.

The system configuration illustrated in FIG. 1 allows the DTE user to communicate effectively with remote computer system 15. Information is transmitted from DTE 10 to Mobidem 11 as an asynchronous stream of data. Mobidem 11 receives this data, processes it, and assembles it into Mobitex data packets (MPAKs), which are suitable for transmission through Mobitex 12. Mobitex 12 receives the MPAKs transmitted by Mobidem 11 and relays those MPAKs to gateway 13. Gateway 13 disassembles the MPAKs and reassembles the data into X.25 data packets that can either be transmitted through X.25 network 14 to remote computer system 15 or, if there is a direct connection between the gateway 13 and the remote computer system 15, transmitted directly to remote computer system 15.

In a similar fashion, remote computer system 15 can transmit information to DTE 10. Remote computer system 15 transmits X.25 data packets to gateway 13, where they are disassembled and reassembled into MPAKs that are transmitted through Mobitex 12 to Mobidem 11. Mobidem 11 disassembles the MPAKs and transmits the data to DTE 10 as a serial asynchronous data stream.

In FIG. 1, gateway 13 acts as an intermediate node between Mobitex 12 and X.25 Network 14. Instead of connecting to remote computer system 15, a DTE user may communicate with another DTE user by designating that data packets be routed to another Mobidem (not shown). In this way a DTE user can communicate directly with another DTE user through Mobitex 12.

AT Modems have two basic states of operation; a command state and a data transfer state. In the command state, the DTE user can send command signals to modem 11 to set various modem operating parameters and store these parameters in memory. The DTE user sets these parameters by sending control signals across RS-232 cable 16 to modem 11. These parameters may be stored in a memory device, such as an electrically alterable ROM, so that the user's selected operating parameters are not lost if modem 11 is turned off and back on. Some of these commands and stored parameters within the Mobidem-AT include:

a) setting the forward characters and idle timer used in the method of padding data packets, b) sending Qualified data messages to the gateway as initiated by the DTE user or as initiated by the Mobidem-AT, c) the storing of dial strings with the ability to delineate hidden characters within those dial strings to make them unreadable, and d) setting of the special scrolling parameter that sends a line feed to the DTE user's terminal whenever a carriage return is sent by the DTE user.

Similarly, a gateway 13 possesses two states of operation. These states include a connecting or connect state and a connected or data transfer state. During the connect state the gateway 13 makes a connection for a given DTE user. The gateway 13 looks for connection data to assist in addressing the remote computer system 15 and in performing scripting or other gateway functions. In the data transfer state, all data received from the DTE user passes directly to the remote computer system 15 and all data from the remote computer system 15 passes to the DTE user. The control channel is the only way a user can send gateway commands during the data transfer state. The DTE user accesses the control channel by leaving the data transfer mode and issuing an AT command. This process is discussed in detail below.

Operation of the gateway 13 in connection with Mobidem 11 and a remote computer system 15 involves several protocol layers. FIG. 2 is a detailed illustration of the various protocol layers involved in supporting an end-to-end connection between Mobidem 11 and gateway 13 or another Mobidem. These layers work together as defined by the International Standard's Committee (ISO's) paper on Open System Interconnect (OSI). Each protocol layer has its own distinct header that enables it to perform its specific protocol functions. The exact format of each protocol, the service definition between the different layers and the function of each protocol is set forth in a series of documents available from Ericsson Sweden and Eritel Sweden including:

a. Mobilex Terminal Specification 001 53-03/L2BA 703 1001 Section: Mobitex Network Layers for Terminals S/1056-A-296 S171/0 Ue Eritel AB, Sweden b. Mobitex Transport Protocol, Release B (MTP/1) Y/KL-91:754 1/115517-CALA 88215 By: Anders Olsson and Eddie Johansson Ericsson Mobile Communications AB c. Mobitex Transport Service Definition AUR-92:760 By: Anders Olsson Ericsson Mobile Communications AB d. MCP/1 Mobitex Compression Protocol ECS Y/G-93:0242 By: Herb Little Research In Motion, Waterloo, Canada and Ericsson AB, Sweden e. MCP/1 Mobitex Compression Service Definition ECS Y/G-93:0241 By: Herb Little Research In Motion, Waterloo, Canada and Ericsson AB, Sweden As shown in FIG. 2, adjacent layers make use of lower layers for services. The application on both sides of the Mobitex connection makes use of the session and compression interface to access a range of session/compression services. Examples of these services include: Session Open (Accept) Connection, Session Close Connection, and Session Send Data. The functions of these services include opening a session, closing a session, and sending data through a session. Each of these services is completely defined by the MCP/1 specifications referenced above.

The Compression layer 23 makes use of the transport interface 22 to access a range of transport services, including, Transport Open Connection, Transport Close Connection, and Transport Send Data. The function of these services is to open a transport connection, close a transport connection, and send data through a transport connection. Each of these services is completely defined by the MTP/1 specifications referenced above. The transport layer 22 interfaces with the network layer 21 and makes use of the network layer 21 for services. The object of the transport layer 22 is to guarantee the delivery of data.

The transport layer 22 makes use of the Network layer 21 for network services. The basic function of the Network layer 21 is to build and interpret MPAKs. The radio protocol layers 28 implement ROSI and GMSK, which perform the modulation/demodulation required to convert data into the RF format used by Mobitex. ROSI is a method used to place data into small packets for transmission. GMSK stands for Gauss Mean Shift Keying and is a modulation technique used for modulating FM data on a radio signal.

Establishing and maintaining a connection between Mobidem 11 and gateway 13 through Mobitex 12 involves each of the protocols shown in FIG. 2. For example, the gateway 13 passes data, as it arrives from Mobitex 12, through the X.25 layers and to the Network layer 21. Data arrives at Network layer 21 in MPAKs, where the data is checked to make sure that data is in the correct format and is then passed to Transport layer 22. The MTP/1-based Transport layer 22 looks at the MTP/1 message type, found in the first three bytes of the message, also called the message header, to determine how to process the MTP/1 message. Protocol messages exchanged between different Transport layers 22 are called Transport Protocol Data Units (TPDUs) and follow the format documented in the MTP/1 specification referenced above. After Transport layer 22 has decoded the TPDU, it passes the message up to Compression/Session layer 23 as a compression message. Protocol messages exchanged between different Compression layers 23 are called Compression Protocol Data Units (CPDUs) and follow the format documented in the MCP/1 specification referenced above. Session layers 23 interface with Applications 24 and 26.

Figure 3:
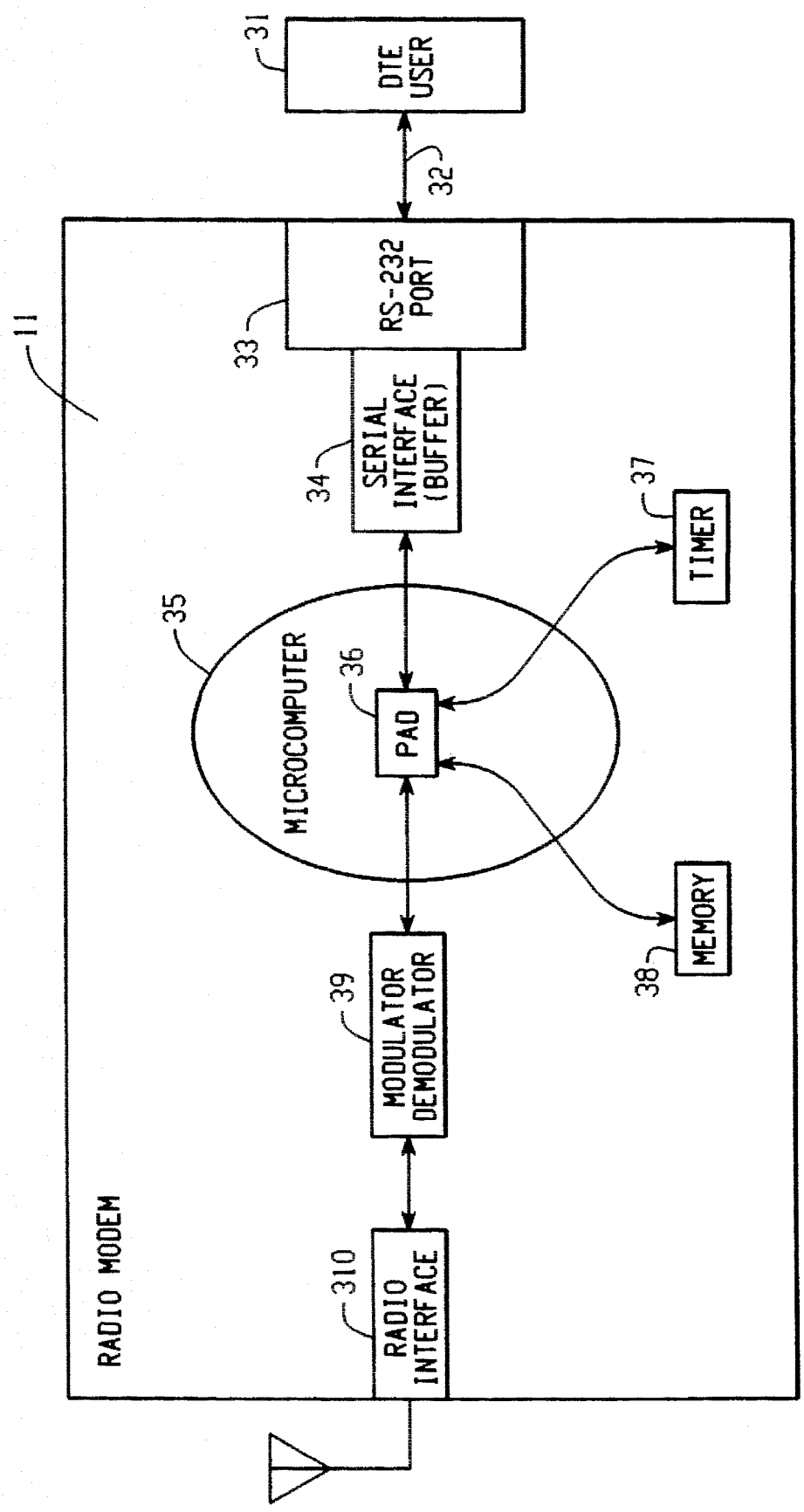
FIG. 3 is a general block diagram of the basic hardware components of a Mobidem-AT device suitable for use with a wireless communication network.

FIG. 3 is a general block diagram of a Mobidem-AT 13, which is suitable for use with a wireless communication network such as Mobitex 12.

As noted, the Mobidem-AT 11 of FIG. 1 is connected to the DTE 10 by an RS-232 asynchronous serial cable 16. In FIG. 3 the process of padding data in the Mobidem 11 and flushing data to the network 12 is driven by characters arriving from the DTE user 31 at the serial port 33 of the radio modem 11. This data originates at the DTE user 31, and arrives at the serial port 33 via a serial cable 32. The RS-232 port 33 accepts the incoming electrical signals from the serial cable and transforms it into machine readable characters. The interface then transmits these characters into the serial interface buffer 34. The buffer 34 is a special portion of memory devoted to storing the characters arriving from the serial port 33. The data is then passed to a microcomputer 35. The Packet Assembler/Disassembler (PAD) 36 is contained within the microcomputer 35, which takes this data and forms packets stored in the memory area 38 that will eventually be sent to the network 12. When a forwarding event takes place the PAD 36 running in the microcomputer 35 sends the buffer data to the modulator/demodulator 39 for transmission to the radio network 12. After modulating the data it is transmitted to the radio interface 310 for final transmission to the radio network 12 using the appropriate radio protocol.

Figure 4:
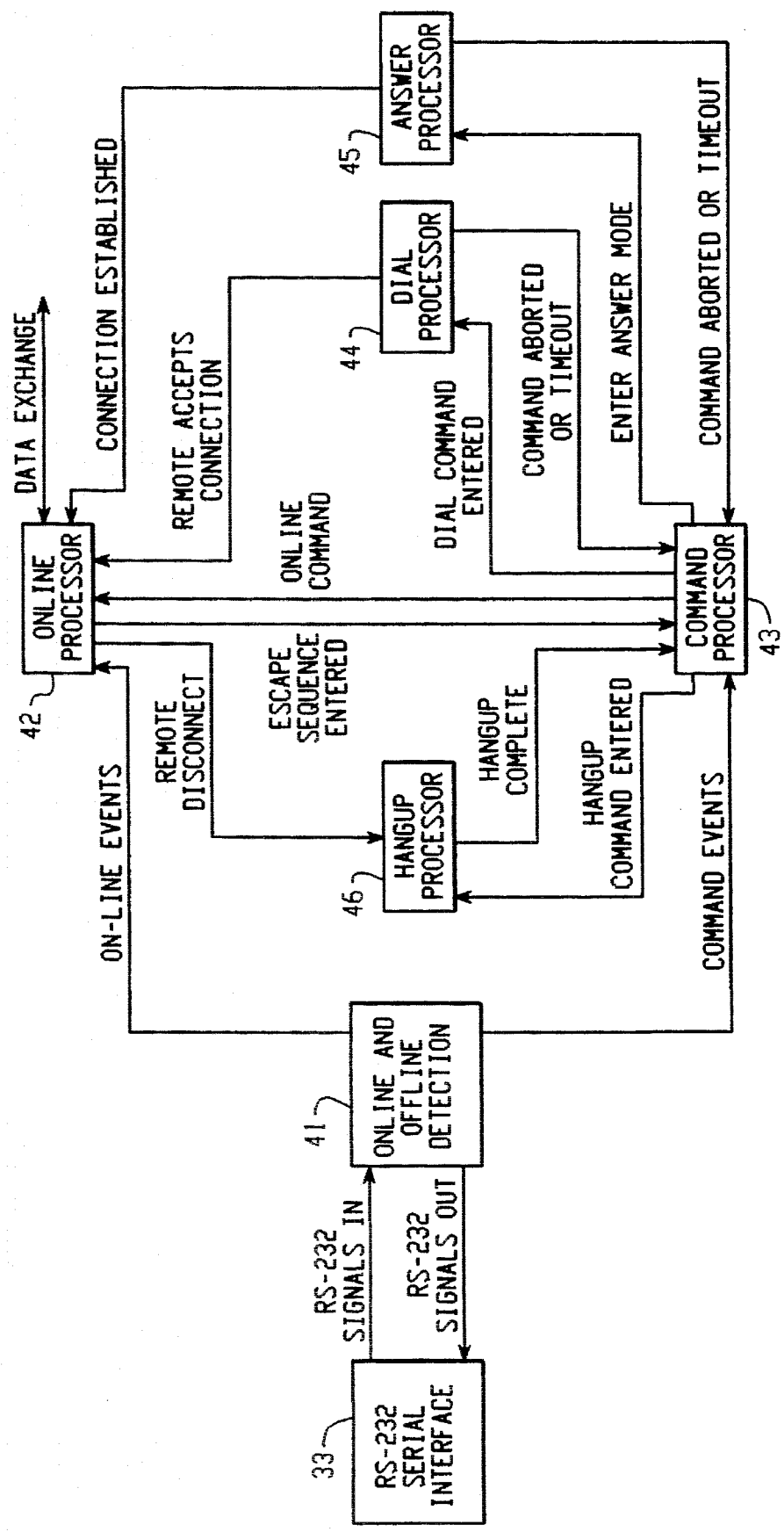
FIG. 4 is a data flow diagram showing an overview of the software modules involved in the Mobidem-AT to process commands and exchange data.
Figure 4A:
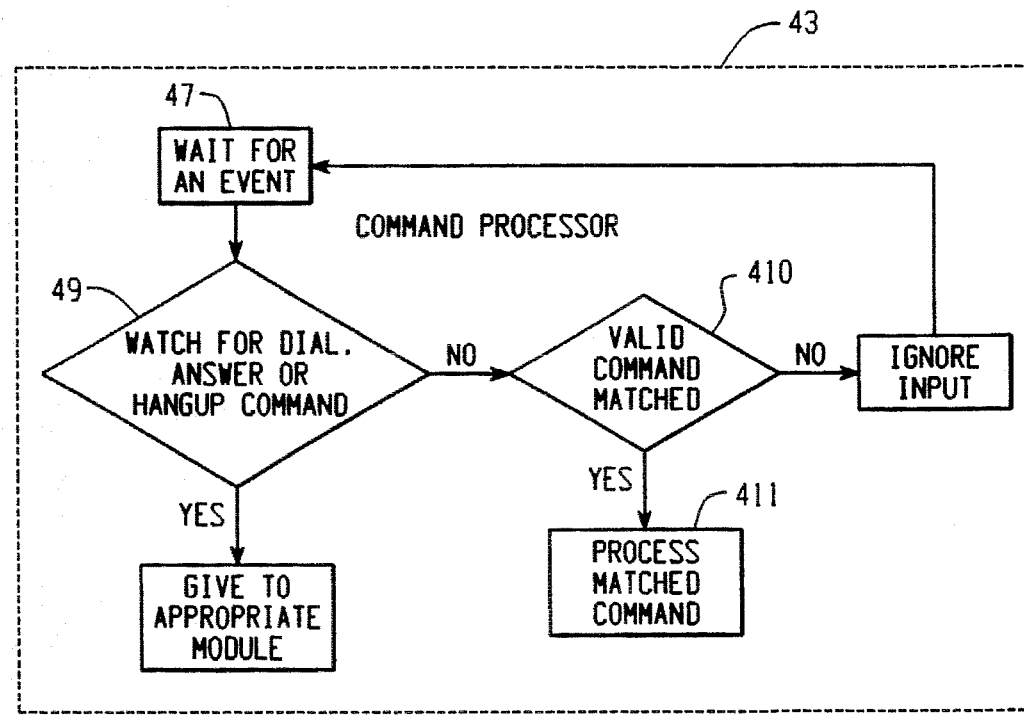
FIG. 4A is a state diagram showing an overview of the Command Processor module 43.
Figure 4B:
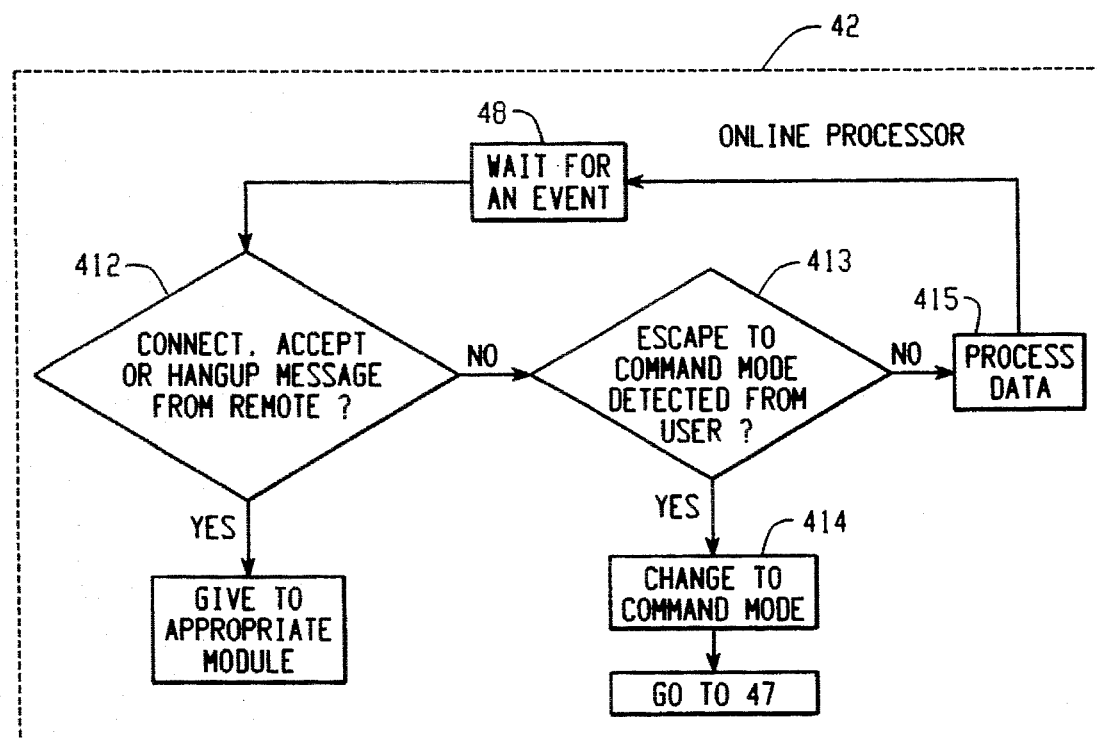
FIG. 4B is a state diagram showing an overview of the Online Processor module 42.

In FIGS. 4, 4A, and 4B an overview of Mobidem-AT 11, detailing the operation of the PAD 36 software component of FIG. 3 as shown. The interface to the DTE User is the RS-232 Interface 33, also shown at FIG. 3. As RS-232 signals arrive, which include timing events, they are passed to the Online and Offline Detection module 41. The Online and Offline Detection module will route the incoming events from the RS-232 Serial Interface to the Online Processor module 42 or to the Command Processor module (or Offline Processor module) 43. For those commands or events that cause a transition from one mode to another there are separate modules to handle each case. The Mobidem-AT 11 starts up in command mode, when first powered on. If the DTE user enters a dial command the Dial Processor module 44 is given control. It monitors for a timeout, resulting from the absence of a response from the remote system 15 or a connection accept or reject from the remote system 15. Another transition command could be placing the Mobidem-AT into answer mode, which is handled by the Answer Processor module 45. The final transition command is the hangup command, given to the Hangup Processor module 46.

Also shown in FIGS. 4A and 4B is a further break-down of the Command Processor module 43 and On-Line Processor module 42. They both loop, waiting for any incoming events 47 and 48 that may be passed to them. At any time the Hangup, Dial, or Answer Processor module can change the mode based on the actions of the remote system 15. The Command Processor module 43 watches for a series of valid commands that can be entered by the DTE user. If the command is a dial, answer, or hangup command 49 then the event is passed to the appropriate module 44, 45 or 46. Otherwise all other commands are detected at step 410 and processed at step 411, as appropriate.

When waiting for events at step 48 in the Online Processor module 42 if a connect, accept, or hangup message is detected at step 412 from the remote system 15, the message is given to the appropriate module 44, 45, or 46. Additionally, if the DTE user uses the 'escape to command mode' sequence at step 413, normally defined as three plus (+) signs, the On-line Processor module 42 will change the mode to command mode at step 414. If these events are not detected the data is processed at step 415 by sending it to the DTE user or sending it to the remote system 15, depending on the originator of the data, i.e. data from the DTE user is sent to the remote system 15 and data from the remote system 15 is given to the DTE user.

Figure 5B:
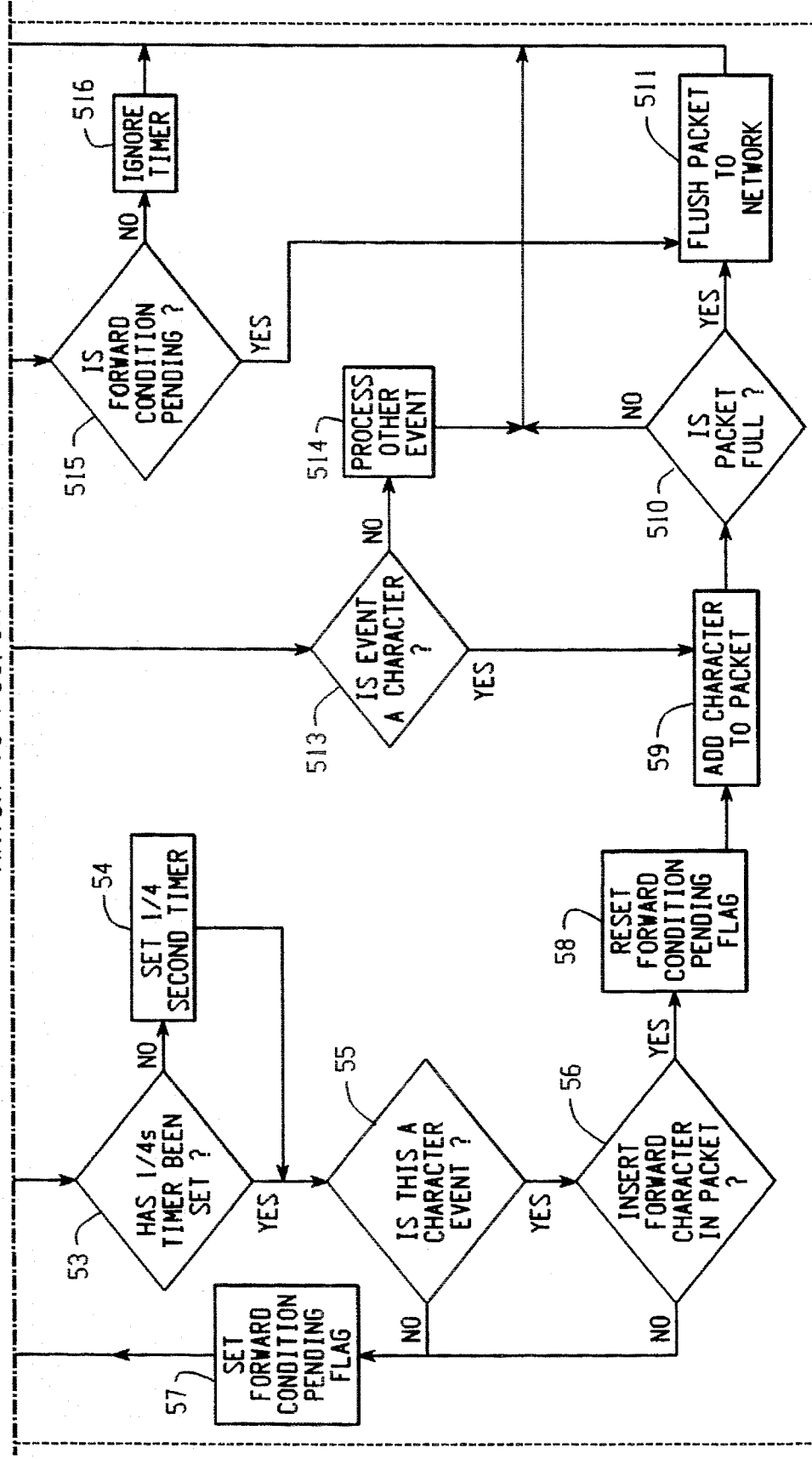
FIG. 5 is a state diagram illustrating the preferred method for a Mobidem-AT to perform padding of packets to ensure they are fully utilized.

FIG. 5 is a state diagram showing the preferred method for padding packets and determining when to send packets to the radio network 12. The serial interface buffer 34 can store both characters and timer events from the timer 37, known as idle timer events. There are two types of idle timer events, the first is based on the DTE user programmed idle timer setting in the Mobidem-AT 11 and the other is the ¼ second flush delay timer to detect if additional characters are not arriving after a forwarding character. Without the flush delay timer, if two forwarding conditions occur consecutively, the PAD will interpret this as two distinct forwarding conditions, and then try to send two packets to the radio network 12, the second of which will contain only one character—the second forwarding character. This is a very inefficient use of the bandwidth of the radio modem 11. Also, the first packet may be partially full as well. This flush delay timer value is typically set to 250 milliseconds or ¼ second. This amount of time is normally sufficient to allow another character to arrive at the buffer 34 at slow baud rates. After 250 milliseconds this flush delay timer will elapse and inform the PAD. If any characters have been received by the PAD during this delay period, they will be added to the current packet, and the lapsing of the delay timer will be ignored. This helps to maximize packet usage since partially filled packets will not be flushed to the modulator/demodulator 39 if more characters are available than can fit into a given packet. If no characters arrive during this delay time, then the current packet will be sent to the radio network 12. The primary focus of FIG. 5 is defining the operation of the ¼ second flush delay timer.

The PAD 36 is continually looping and watching for events in the On-line Processor module 42 as shown in the FIG. 4B at step 48. In the case that the answer to step 413 is 'NO' then at step 51 the PAD 36 assumes the data is related to character processing and proceeds to echoing line feeds after a carriage return, described in detail below with FIG. 8. After the characters have been processed in FIG. 8 the PAD 36 then checks for a series of flush conditions that could occur at step 52. The first flush condition that can occur is the expiration of the DTE user's idle timer. The idle timer event indicates that there has not been any activity along the RS-232 link 32 from the DTE user 31 for a specified length of time. The idle timer is considered to be an inactivity timer and can be set by the DTE user via an Mobidem-AT command when in command mode. When no characters have been received at the buffer 34 for the specified length of time, the idle timer expires. This expiration indicates to the PAD 36 that it should forward the packet to the network 12 since the user is idle.

The second flush event at step 52 that can take place is through the definition of two special characters, which are known as the forwarding characters. These characters are used to signal the PAD 36 that the DTE user has entered a character that has been defined to indicate the end of text. These characters are usually carriage return and linefeed, but are not limited to these two characters. Forwarding characters can be defined by the DTE user via Mobidem-AT commands at any time when in command mode. The character must be a valid character from the first seven rows of the International Alphabet 5 (IA5) chart or standard ASCII table.

The forwarding characters and the idle timer event form the set of flush conditions. These flush conditions tell the PAD 36 to send data to the modulator/demodulator 39. The forwarding conditions are stored in the memory 38 of the radio modem 11. The PAD 36 will check to see if a forwarding event has been received. The PAD 36 can be set up to check for or to ignore the forwarding characters and/or the idle line timer. The PAD 36 uses a series of special user commands to determine which set of forwarding conditions are to be recognized. If the event received is a flush event PAD 36 proceeds to step 53 where the PAD 36 determines if the one-quarter second delay timer has already been set, i.e. the PAD 36 determines if this is a subsequent flush event.

If the flush delay timer has not been set at step 53, this indicates that this is the first flush event that has occurred in the last one-quarter second. The one-quarter second timer is then set at step 54 and PAD 36 proceeds to check whether the flush event was a forwarding character at step 55.

If the delay timer had been previously set at step 54, this indicates that a flush condition has previously occurred in the past one-quarter of a second. If the flush event was not a character at step 55 and was the idle timer event at step 53 then an additional ¼ second will be allowed for any additional characters. PAD 36 then proceeds back to wait for events and set the forward condition pending flag at step 57 which indicates that forwarding of all pending characters that would normally have been sent to the network 12 is held. If the flush event is a character at step 55 a test is performed at step 56 to see if the character may or may not be placed into the packet, depending on the setting of certain parameters in the Mobidem-AT 11. If the character is not to be added to the packet then PAD 36 proceeds to wait for events after setting the forward condition pending flag 57. If the character is to be placed into the packet PAD 35 sets the forward condition pending flag at step 58 and then the character is added to the packet currently be assembled at step 59.

After adding the character, if the packet now becomes full at step 510 the packet is flushed to the network at step 511. In all cases, the PAD 36 returns to the wait state to wait for the next event at step 48.

If the event at step 52 is not a flush event PAD 36 proceeds to check to see if it was the ¼ second timer expiring at step 512. If the event is not the expiration of the delay timer but is some other kind of event, a test is performed to see if a character has been received at step 513 from the DTE user 31. If the event was not a character then it must have been some other kind of event that must be processed at step 514 and PAD 36 returns to wait for further events at step 48. If it was a character then it is placed into the packet at step 59. If the packet is now full at step 510, it is forwarded to the network at step 511. The PAD 36 returns to the wait state to wait for the next event.

If the event at step 512 is the expiration of the delay timer then PAD 36 checks to see if the forward condition pending flag is set at step 515. If the forward condition pending flag is not set, the flush delay timer expiration is ignored at step 516. The PAD 36 then returns to the wait state to wait for the next event.

If the event at step 512 is the expiration of the timer, and the forward condition pending flag is still set at step 515, then the packet is flushed to the network at step 511. The expiration of the timer, with the forward condition pending flag set indicates that no more character data has arrived after the last flush condition within the last one-quarter second.

Referring again to FIG. 4, the Mobidem-AT 11's command processor module 43 is looping in the On-line state watching for input events at step 47 from the DTE user 31. When a full buffer 34 has been received the buffer 34 transmits data to the Online & Offline Detection module 41 to the correct processor module 42 or 43, depending on the current mode.

Figure 6:
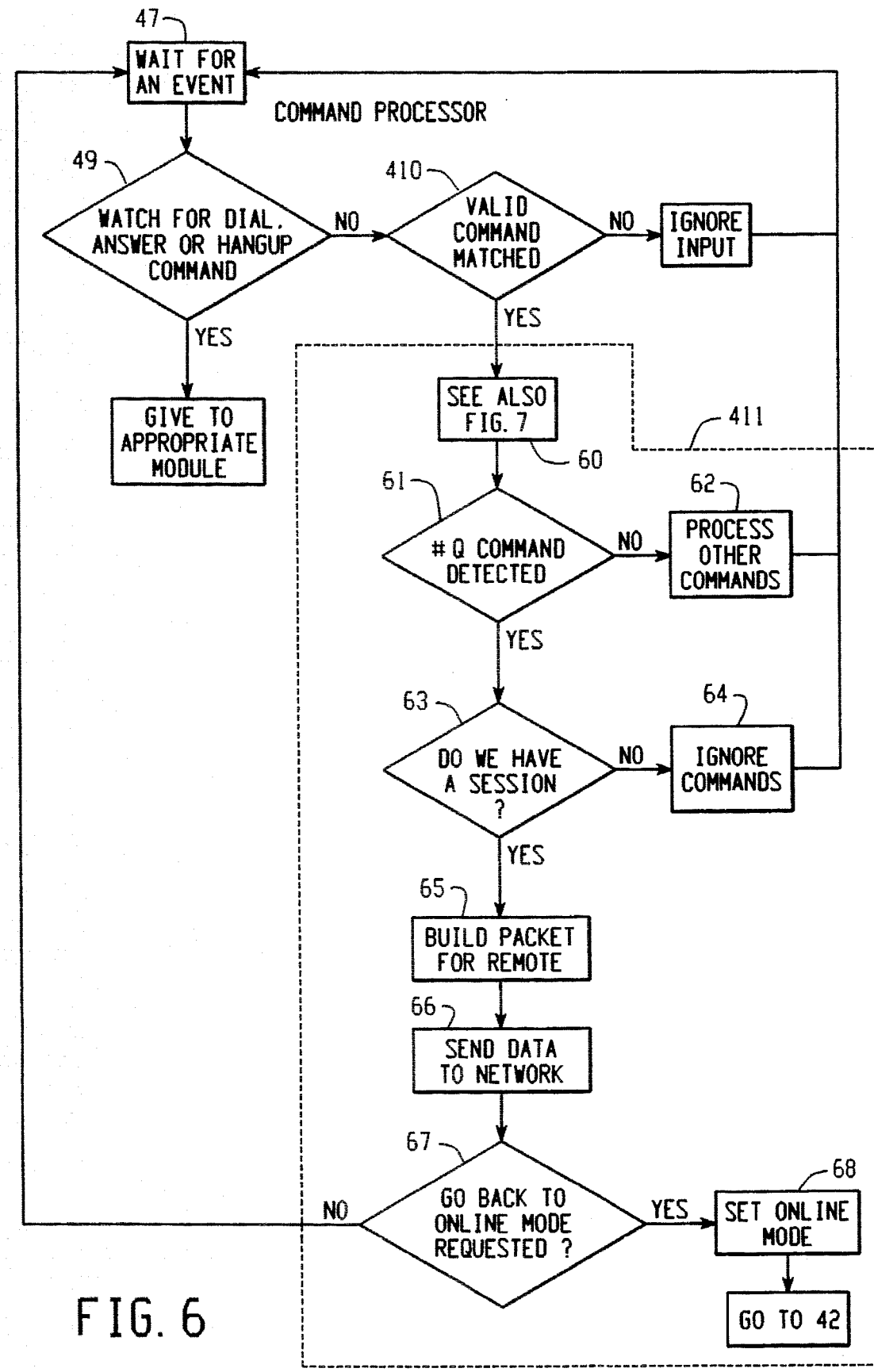
FIG. 6 is a state diagram illustrating the preferred method for a Mobidem-AT to provide access to the control channel for sending gateway commands and X.25 Qualified data.

FIG. 6 shows the preferred method for implementing access to the control channel in the Mobidem-AT 11. The control channel can only be accessed when the DTE user has established a connection to a remote computer system 15. Therefore, the DTE user will have to issue the 'escape to command mode' sequence to get into command mode to execute the special control channel command. The qualified command must be entered in command mode only and only after a fully established session exists to a remote system 15. If the answer to 410 is yes PAD 36 proceeds to step 411 which is detailed in FIG. 6 and processes hidden characters in a dial string at step 60, which is detailed below. After step 60 a test is performed to see if the command is a Qualified Data command at step 61. If it is not a Qualified Data (#Q) command then PAD 36 processes whatever command the user entered at step 62. If this is a Qualified Data command PAD 36 checks to ensure the DTE user has escaped from On-line mode at step 63. If the DTE user has not escaped from on-line mode PAD 36 ignores the command at step 64 because cannot be sent anywhere.

If the PAD 36 has just escaped on-line mode then the Qualified Data command is accepted and the data to be sent is extracted from the command at step 65. The data is then assembled into a packet and is transmitted over the network 12 to the Gateway or remote computer system 15 at step 66. Once the data has been transmitted the command syntax is checked to see if PAD 36 should go back to on-line mode at step 67. Several forms of the Qualified Data command allow the DTE user to automatically jump back to on-line mode after the command is processed. After this the PAD 36 returns to watch for more input commands. If the DTE user issued a command to go back on-line after processing the command then the Online mode is set at step 68. After step 68 PAD 36 proceeds to Online processor module 42.

Figure 7B:
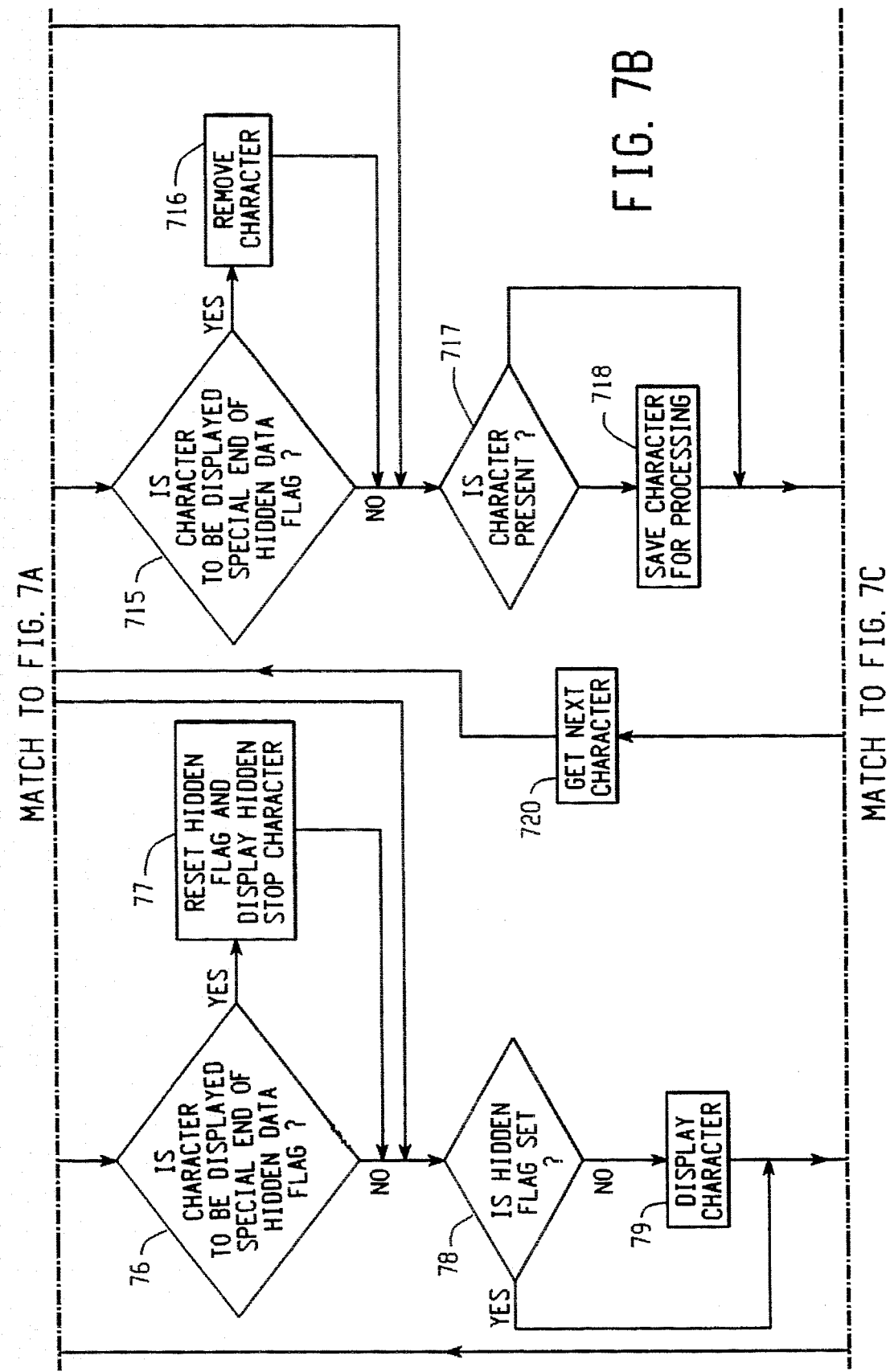
FIG. 7 is a state diagram illustrating the preferred method for a Mobidem-AT to increase security by hiding DTE user defined strings.
Figure 7C:
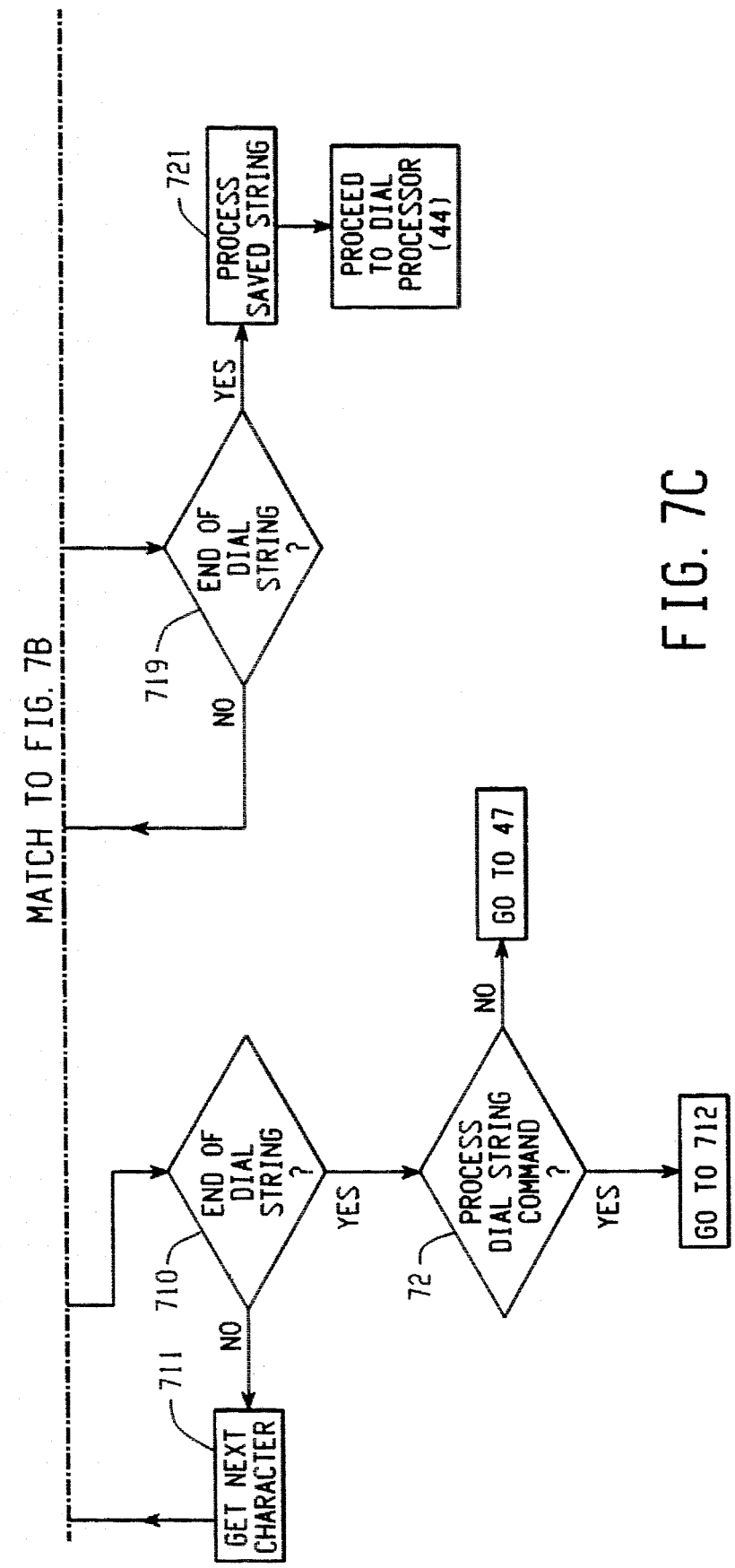

FIG. 7 shows the preferred method for hiding data within the dial strings given to the Mobidem-AT 11. As those skilled in the art will appreciate other standard processing also occurs but is not necessary to be detailed for understanding the present invention. The actual dial string is submitted by the user before being used and is stored in memory 38. The only way to access the memory 38 is through commands entered by the DTE user. A dial string contains the information to pre-program a remote connection request. The dial string is used to store information that can be used to speed up a connection request. This information is the remote MAN number, and if required presentation data. This presentation data is used to give information to the remote when a connection is established. Presentation data can be used to speed up connections to services or for remote login sequences. At any time these stored dial strings can also be used to establish a connection to the remote computer system 15.

Presentation data may contain sensitive information such as user identifications and passwords. This information can be misused if obtained by an unauthorized or unscrupulous user. The memory on the radio modem 11 cannot be accessed by any method other than those described previously. There is no other way ,without physically altering the radio modem 11 to read this memory.

The PAD 36 is in a state watching for Mobidem-AT commands, as shown in FIG. 4A at step 47. From step 410 when a valid command is matched this section of the command parser is watching for dial commands which includes the display stored dial strings command at step 71 and the processing of dial strings command at step 72. If at step 71 there is no dial string command PAD 36 processes other commands and proceeds to step 61. If the answer to step 71 is yes the PAD 36 proceeds to step 73.

The dial string when read from memory is parsed character by character, starting with the first character at step 73 and the PAD 36 watches for the start of hidden data character at step 74. A pair of special characters are defined to delimit the extent of data to be hidden from view. The special characters in the preferred implementation are '{' for the start of hidden data and '}' for the end of hidden data but may be other characters.

If the start of hidden data character '{' is detected at step 74 then the PAD 36 proceeds to step 75. At step 75 a flag is set indicating that the characters to follow are to be hidden and not displayed. The special character is displayed (echoed) to the DTE user, in those circumstances where the DTE user is reading back or executing the dial string. The character itself is not stored in the dial string to avoid sending it to the remote system 15 when executed. If the special start of hidden data character is not detected the end of hidden data character is checked for at step 76. If PAD 36 has received the end of the hidden data characters the hidden character flag is reset and the end of hidden data character is displayed at step 77. From step 75 and step 77 the program then proceeds to check if the hidden flag is set at step 78. If the hidden flag is not set the dial character is displayed at step 79. Otherwise the PAD 36 skips displaying the hidden character thus avoiding showing the sensitive information. Then step 710 checks the end of the stored dial string and if there are more characters PAD 36 proceeds to read the next character at step 711. Otherwise the PAD 36 proceeds to wait for more input commands.

If the dial string command includes a process dial command at step 72 (perform a dial to a remote system) the PAD 36 proceeds to step 712. If the answer to step 72 in no then PAD 36 proceeds to step 47. The dial string, when read from memory, is parsed character by character, starting with the first character at step 712 and the PAD 36 watches for the start of hidden data character at step 714. When preparing a dial string for processing these hidden characters must be removed and not sent to the remote system 15.

If the start of hidden data character '{' is detected at step 713 then the PAD 36 proceeds to step 714. At this point the character is removed from the character buffer so that it is not included for the remote system 15. If the special start of hidden data character is not detected step 715 checks for the end of hidden data character. If the program has reached the end of the hidden data characters the character is removed from the character buffer so that it does not get included in the dial command string at step 716.

Both from step 714 and step 716 the program then proceeds to check to see if there is a character present in the character buffer at step 717. If there is a character present the program proceeds to save the character for processing at step 718. Otherwise the PAD 36 skips storing the character, which should not be part of the normal dial string. Then PAD 36 checks the end of the stored dial string at step 719 and if there are more characters PAD 36 proceeds to read the next character at step 720. Otherwise the PAD 36 proceeds to process the dial string in the Dial Processor module 44.

Figure 8:
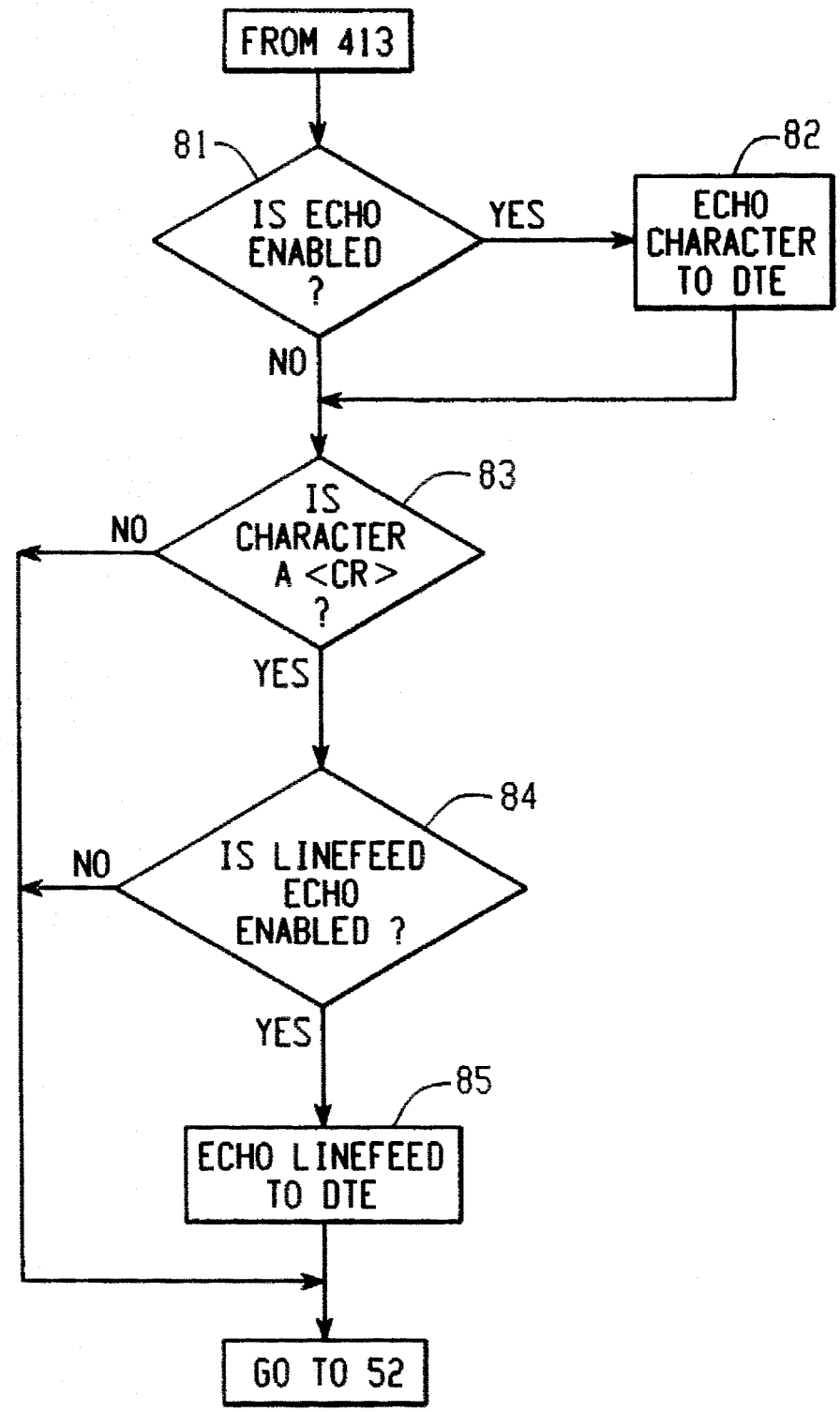
FIG. 8 is a state diagram illustrating the preferred method for a Mobidem-AT to provide scrolling to the DTE user.

FIG. 8 represents the preferred method for inserting a line feed to the DTE user when a carriage return is detected. As those skilled in the art will appreciate other standard processing also occurs but is not necessary to be detailed for the present invention. If on-line echo is enabled by the user using the ATF1 command, the microcomputer 35 will automatically echo any characters received from the serial interface back to the DTE through the serial interface 34. This is done immediately upon receipt of the character in order to maximize the speed of echoing.

Since the echoing of characters is controlled by the microcomputer, it is possible to insert extra characters into the echo data stream going to the DTE user.

By issuing the preferred AT#L1 command to the Mobidem-AT 11, it is possible to force the DTE to scroll after every <CR> (carriage return) is entered on the DTE 10.

When online echoing is enabled, forcing scrolling will allow the user to read each line that is entered, as well as read the data returned from the remote system 15 user. When online echoing is disabled, this feature will force the DTE to scroll up which informs the user that a string of data has been terminated by a carriage return.

The Online Processor module 42 is looping and receiving events and characters to process and packetize for the remote system 15. In FIG. 4B the event loop shows this processing of data at step 415. Step 415 is detailed in FIGS. 5 and 8 and if after step 413 echoing is set at step 81, the character received is echoed to the DTE User at step 82. If the character received was a carriage return character at step 83 then, regardless of whether it was echoed or not, the PAD 36 will proceed to check if linefeed insertion is turned on. If the scrolling option is set at step 84, then a linefeed character is placed into the echo queue for transmission back to the DTE 10 at step 85. This forces the DTE 10 to scroll up by one line. If the special scrolling option is set, a linefeed is placed in the echo queue regardless of whether or not the carriage return is echoed back to the DTE 10. The microcomputer 35 then returns to the wait state to wait for the next character.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

We claim:

1. A method of packetizing data received from a data source, the method comprising the steps of:

accumulating data from the data source into a packet;

processing the data to determine whether one or more forwarding conditions has occurred, and if so storing said forwarding conditions in a memory;

detecting whether said one or more forwarding conditions are stored in said memory;

setting a timer to a first predetermined time period to indicate that at least one of the one or more forwarding conditions has been detected; and if upon the first predetermined time period expiring, no additional data had been received during the first predetermined time period, transmitting the packet.

2. The method of claim 1, including the following steps:

if during the first predetermined time period before the timer expires at least one bit of additional data is received, resetting the timer to a second predetermined time period;

checking whether during the second predetermined time period at least one bit of data is received; and if no data are received during the second predetermined time period, transmitting the packet.

3. The method of claim 2, wherein the first predetermined time period and the second predetermined time period are equal in duration.

4. The method of claim 2, wherein the resetting and checking steps are repeated for one or more subsequent time periods until during one of the one or more subsequent time periods, no data are received.

5. The method of claim 4, wherein at least two of the first predetermined time period, the second predetermined time period and the one or more subsequent time periods are equal in duration.

6. The method of claim 1, wherein presence of a forwarding character is one of the one or more forwarding conditions.

7. The method of claim 1, wherein expiration of an idle timer is one of the one or more forwarding conditions.

8. The method of claim 6, wherein the forwarding character is used only for indicating one of the one or more forwarding conditions and is then discarded.

9. The method of claim 6, wherein the forwarding character is first used to indicate one of the one or more forwarding conditions and then is appended to the packet.

10. The method of claim 1, wherein the data source is a serial data source.

11. An apparatus for packetizing data received from a data source comprising:

a buffer for accumulating data from the data source into a packet;

a processor for determining whether one or more forwarding conditions has occurred, and if so for directing said forwarding conditions to a memory;

means for detecting whether one or more forwarding conditions is stored in said memory;

a timer set to a first predetermined time period if at least one of the one or more forwarding conditions has been detected; and a transmitter for transmitting the packet if during the first predetermined time period before the timer expires, no additional data are received.

12. The apparatus of claim 11, such apparatus further comprising means for resetting the timer to a second predetermined time period if during the first predetermined time period before the timer expires at least one bit of additional data is received;

checking means for determining whether during the second predetermined time period at least one bit of data has been received; and transmitting means for transmitting the packet if no data are received during the second predetermined time period.

13. A method of packetizing data received from a serial data source, the method comprising the steps of:

accumulating data from the serial data source into a packet;

processing the data to determine whether a first set of one or more forwarding conditions has occurred, and if so setting a first forwarding flag stored in a memory on to indicate that the first set has occurred;

detecting whether said first forwarding flag stored in the memory has been set on, and if so setting a timer to a first predetermined time period; and detecting whether any additional data were received during the first predetermined time period, and if no additional data were received and the first forwarding flag had been set on, transmitting the packet.

14. The method of claim 13, including the following steps:

if during the first predetermined time period at least one bit of additional data is received, resetting the timer to a second predetermined time period;

checking whether during the second predetermined time period at least one bit of data is received;

detecting whether during the second predetermined period a second set of forwarding conditions has occurred and if the second set has occurred setting a second forwarding flag on to indicate that the second set has occurred; and if no data are received during the second predetermined time period and if at least one of the first forwarding flag and the second forwarding flag has been set on, transmitting the packet.

15. The method of claim 14, wherein a single flag comprises the first forwarding flag and the second forwarding flag.

16. The method of claim 14, wherein the first set of forwarding conditions and the second set of forwarding conditions are identical.

17. The apparatus of claim 11, wherein one of the one or more forwarding conditions is a predetermined forwarding character.

18. The apparatus of claim 17, wherein the forwarding character is only used to indicate that a packet of data is to be transmitted, and is then discarded.

19. The apparatus of claim 17, wherein the forwarding character is first used to indicate that a packet of data is to be transmitted, and is then appended to the packet.

20. The apparatus of claim 11, wherein one of the one or more forwarding conditions is the expiration of an idle-line timer.

21. The method of claim 1, wherein the processing step further includes comparing the accumulated data to a predetermined set of forwarding characters, and if the comparison step yields a match, storing a forwarding condition in the memory.

22. The method of claim 1, wherein the processing step further includes:

setting an idle-line timer to a predetermined idle time period upon the receipt of data from the data source;

generating and storing a forwarding condition if the idle-line timer expires before additional data is accumulated from the data source; and resetting the idle-line timer if additional data is accumulated prior to the expiration of the timer.

* * * * *